United States Patent [19]
Johnson

[11] Patent Number: 4,964,987
[45] Date of Patent: Oct. 23, 1990

[54] CROSS FLOW FILTER APPARATUS

[76] Inventor: Willard L. Johnson, 12923 W. Lincoln Ave., Huntington Woods, Mich. 48070

[21] Appl. No.: 205,456

[22] Filed: Jun. 10, 1988

Related U.S. Application Data

[63] Continuation-in-part of Ser. No. 120,581, Nov. 19, 1987, Pat. No. 7,859,332, which is a continuation-in-part of Ser. No. 24,383, Mar. 19, 1987, abandoned, and a continuation-in-part of Ser. No. 932,010, Nov. 26, 1986, Pat. No. 4,790,935.

[51] Int. Cl.$^5$ .......................................... B01D 29/62
[52] U.S. Cl. ..................... 210/332; 210/346; 210/407; 210/409; 210/420; 210/486; 210/538
[58] Field of Search ............... 210/121, 193, 298, 406, 210/332, 346, 407, 409, 420, 486, 538

[56] References Cited

U.S. PATENT DOCUMENTS

| | | | |
|---|---|---|---|
| 3,635,343 | 1/1972 | Holland | 210/406 |
| 4,519,903 | 5/1985 | Johnson | 210/94 |
| 4,579,656 | 4/1986 | Johnson | 210/234 |

FOREIGN PATENT DOCUMENTS 2094653  9/1982  United Kingdom .

Primary Examiner—Richard V. Fisher
Assistant Examiner—Wanda L. Millard
Attorney, Agent, or Firm—Basile and Hanlon

[57] ABSTRACT

A cross flow filter apparatus and method uses an open tank having a first liquid retaining section, a second filter retaining section and a third solids collecting section in fluid communication with each other. A filter assembly is retained within the second section and includes a filter panel having a generally vertically disposed filter membrane surface, preferably with submicron pores. Filtrate is removed by applying low vacuum pressure, in the range of about 5 inches vacuum pressure (Mercury), in communication with the filter panel such that filtrate is drawn through the pores of the filter membrane surface at a flow rate $Q_{out}$. Fluid to be filtered is cross flowing vertically downward across the filter membrane surface at a flow rate $Q_x$, such that the horizontal velocity $V_h$ of fluid drawn through the filter membrane surface is less than the vertical velocity $V_v$ of the cross flowing unfiltered fluid. The excess high velocity cross flowing unfiltered fluid imparts a shearing action to particles resting on the filter membrane surface to rehabilitate the filter membrane, thereby continuously offering a clean filter membrane surface for continued filtration. Excess unfiltered cross flowing fluid is recirculated between the first and second sections of the tank, while allowing entrained particles to settle to the solids collecting section of the tank as the recirculated fluid mixes with incoming unfiltered fluid prior to recirculation and discharge vertically downward across the filter membrane surfaces.

14 Claims, 3 Drawing Sheets

CROSS FLOW FILTER APPARATUS

RELATED APPLICATIONS

This application is a continuation-in-part of co-pending patent application Ser. No. 07/120,581 filed Nov. 19, 1987, which is now U.S. Pat. No. 4,859,332 and a continuation-in-part of co-pending patent application Ser. No. 07/024,383 filed Mar. 19, 1987, which is now abandoned and a continuation-in-part of co-pending patent application Ser. No. 06/932,010 filed Nov. 26, 1986, which is now U.S. Pat. No. 4,790,935.

FIELD OF THE INVENTION

This invention relates to a filter apparatus and, in particular, to a filter apparatus having vacuum filter panels disposed in a cross flowing fluid stream.

BACKGROUND OF THE INVENTION

My prior United Kingdom patent application, GB No. 2 094 653 A published on Sept. 22, 1982, discloses parallel filters which are alternately communicated with two separate manifolds by means of a valve which passes filtrate selectively from one of the manifolds to a pump and discharge ducts. When sufficient liquid has been fed to the filter tank, the pump is operated to draw filtrate from one of the manifolds. When a vacuum gage senses a reduced flow rate from one manifold, the timer controlled valve moves to draw filtrate from the other manifold and actuates a second valve to cause a pulsed back flow in the first filter set to clean the filter media. If the liquid level in the tank falls, a third valve diverts the discharge from the pump back into the tank. Sludge is removed from the bottom of the tank by simply draining off or by a conveyor. The filter units include filter cloth covering an expanded metal panel fitted onto a manifold coupling. The filter unit is sealed against the manifold by a ring seal compressed under the weight of the filter unit or by clamps for the filter unit. The external surface of the filters can be fitted with flat or curved louvers. A magnetic bar can also be provided at the top of the filter units so that they can be removed by a magnetic hoist. A fourth valve mechanism in the manifold is opened automatically when the filter is fitted on the manifold.

My prior U.S. Pat. No. 4,591,903 discloses a suction-type filter machine having a plurality of filter leaves. Each filter leaf includes a core panel of egg-crate type walls defining transverse passageways through the panel and openings through the walls to provide vertical, horizontal and longitudinal passageways for filtrate flow. The filtrate is drawn through the filter medium enwrapping the core panel by a suction pump. A conduit conductor encloses an edge portion of the core panel for communicating the filtrate flow from the interior of the core panel through a manifold connected with the suction end of the filtrate pump. The effluent to be filtered is charged into the tank of the filter machine from above the filter leaves or units, so that there is a continuous downward flow of polluted liquid and its entrained solids from the input opening to the solid discharge portion of the filter machine. The filter machine can continuously filter a very large volume of polluted liquid and simultaneously separate the solids therefrom for discharge to the settling tank portion of the machine. The relatively close spacing between the side-by-side proximity of the filter units, one with another, is governed by the diameter of the filter medium covered discharge tube or conduit mounted on and at one end of the filter core panel. The filter machine has substantially zero flow of liquid below the filter units, thereby allowing the solid particulates to settle readily to the bottom of the filter tank. The filter leaf core panels can easily be removed from the machine by merely picking them up from their positions of rest upon the support manifolds in the tank.

My prior U.S. Pat. No. 4,579,656 discloses a leaf-type filter system, in which a suction pump is employed to pump filtered fluid from a series of individual filter leaves connected to an individual leaf chamber via a fluid coupling located above the surface of fluid being filtered. The couplings are of inverted U-shape and have a sliding sealing fit with the vertical outlet tube of a filter leaf and a vertical receiving tube mounted in a manifold or header external of the main filter tank. Identical individual filter leaves are formed in a rectangular configuration of relatively narrow lateral thickness. Along one vertical side edge of the leaf, a cylindrical coupling tube is mechanically attached to the core of the leaf and is in fluid communication with the internal chamber defined by the leaf core to constitute the outlet tube for conducting filtrate from the leaf. The outlet tube projects upwardly above the horizontal upper surface of the rectangular leaf and, when located in the filter tank, the upper end of the outlet tube projects above the surface of fluid to be filtered contained in the tank. The diameter of the leaf outlet tube is made larger than the lateral thickness of the leaf. The interchangeable leaves are placed into the tank with the outlet tubes of alternate leaves at opposite sides of the tank. Vertical guides on the inner sides of the tank are employed to locate the outlet tubes laterally along the walls. The relatively thin, vertical end edge of one leaf is engaged between the outlet tubes of the two adjacent leaves in side-by-side relationship with a spacing between the leaves determined by the amount by which the outlet tube diameter exceeds the lateral thickness of the leaf itself. A closed manifold is located on opposed outer sides of the main filter tank. Receiving tubes opening into the interior of the manifold project upwardly through the upper wall of the manifold and are located to be in alignment with the respective outlet tubes of the filter leaves. The individual outlet tubes of the filter leaves and the associated receiving tube of the adjacent manifold are detachably coupled to each other by an open-ended coupling tube of inverted U-shaped configuration. The opposed ends of the U-shaped coupling tube are dimensioned to slidably fit into the upper ends of a filter leaf outlet tube and its associated receiving tube to thus place the interior of the manifold in fluid communication with the outlet tube of the leaf. A suction pump connected to each manifold establishes fluid flow of filtrate from the leaves to the outlet tube, coupling tube and manifold for transfer to a collection point. The individual leaves are easily removed and replaced by manually lifting the coupling tube to slip it off the outlet tube of the leaf and the receiving tube of the header, at which time the leaf is available for manual removal.

Many of the known leaf-type filter machines have short operating cycles due to the solid particulates collecting on the filter medium, clogging the openings, which results in the rapid build-up of a cake on the filter and correspondingly reduces the amount of filtrate flow. Tremendous amounts of time are consumed in shutting down the filter machines and cleaning the cake from the filters. The present invention provides increased operating cycles with more efficient filtration characteristics. The present invention is capable of filtering submicron particles from large volume of fluid in a relatively small compact apparatus. The present invention also provides relatively light weight filter panels that are inexpensive to manufacture and maintain. The filter panels of the present invention also include the feature of easily replaceable filter membrane sheets.

SUMMARY OF THE INVENTION

The present invention of a cross flow filter apparatus includes a tank having a first liquid retaining section, a second filter retaining section and a third solids collecting section in fluid communication with each other. A filtering assembly is retained within the second section and includes a filter panel having a generally vertically disposed filter membrane surface. Filtrate removal means applies vacuum pressure in communication with the filter panel such that filtrate is drawn through the pores of the filter membrane surface at a flow rate $Q_{out}$. Cross flow means discharges liquid at a flow rate $Q_x$ vertically downward across the filter membrane surface, such that the horizontal velocity $V_h$ of liquid drawn through the filter membrane surface is less than the vertical velocity $V_v$ of the cross flowing liquid, wherein the vertical velocity $V_v$ of the cross flowing liquid imparts downward force on particles to move or flush the particles downward across the filter membrane surface toward the solids collection section of the tank. Preferably, the cross flow rate $Q_x$ is greater than the filtrate flow rate $Q_{out}$ and recirculating means circulates liquid between the first and second sections of the tank. Passage means are provided for withdrawal of settled solids from the solids collecting section of the tank. In addition, skimming means can be provided for removing floating contaminants, such as oil or the like.

In a second embodiment of the invention, flow diverting means are provided between adjacent filter membrane surfaces for increasing the vertical velocity $V_v$ by narrowing the general vertical liquid flow passageway adjacent the filter membrane surface to a generally horizontal cross sectional area $A_h$ such that the vertical velocity $V_v$ is at about nine feet per second, and $V_v = (Q_x/A_h) - V_h$ wherein $V_h = Q_{out}/A_m$ and $A_m$ is an area of the filter membrane surface. In yet another embodiment, a flexible mesh screen, wire cloth or grid is disposed between adjacent filter panel membrane surfaces parallel to the membrane surface extending the entire length and height of the filter membrane surface to enhance the flushing action of the vertical flow by disrupting the relatively stagnant laminar film immediately adjacent the membrane surface.

The apparatus operates to filter fluid through a filter assembly including a filter panel having a generally planar vertically disposed filter membrane surface with pores. Filtrate is drawn through the pores of the filter membrane surface at a flow rate $Q_{out}$ by application of vacuum pressure, preferably generated by the suction inlet of a fluid pump, disposed in communication with the filter panel. Fluid to be filtered is discharged at a flow rate $Q_x$ vertically downward across the filter membrane surface such that the horizontal velocity $V_h$ of the fluid is less than the vertical velocity $V_v$ of the fluid and the flow rate $Q_x$ is greater than the flow rate $Q_{out}$. Unfiltered fluid is recirculated from below the filter panels to a fluid retaining section of the tank for subsequent recirculating discharge vertically downward across the filter membrane surface. The recirculating fluid flow from below the filter panels is subjected to an appreciable decrease in velocity, such that solids flushed from the membrane surface are allowed to settle from the fluid to a solids collection section of the tank for removal.

Unfiltered fluid flow can be diverted by a member which narrows the generally vertical fluid flow passageway adjacent the filter membrane surface to a generally horizontal cross sectional area $A_h$, wherein the vertical velocity $V_v$ is at about nine feet per second and $V_v = (Q_x/A_h) - V_h$. The horizontal velocity $V_h = Q_{out}/A_m$, where $A_m$ is the area of the filter membrane surface. The flow rate $Q_{in}$ of fluid to be filtered into the fluid retaining section of the tank is generally controlled such that $Q_{in}$ is approximately equal to $Q_{out}$.

In another embodiment, the velocity profile of the cross flowing fluid to be filtered can be disrupted by a flexible mesh screen, wire cloth or grid disposed adjacent the filter membrane surface inducing more turbulent flow to enhance the shearing or flushing removal of particles from the filter membrane surface by the cross flowing fluid.

BRIEF DESCRIPTION OF THE DRAWINGS

The present invention will become more apparent by reference to the following detailed specification to be read in context with the attended drawings in which.

DESCRIPTION OF THE PREFERRED EMBODIMENTS

Figure 1:
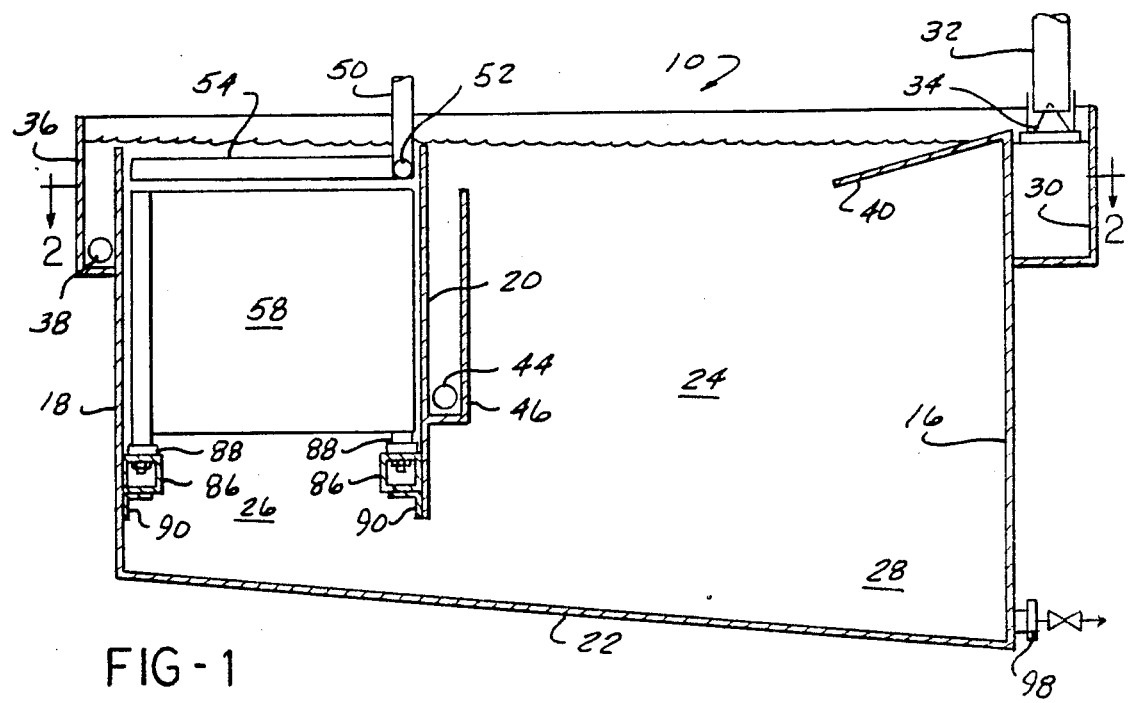
FIG. 1 is a cross sectional side elevational view of a filter apparatus embodying the present invention.
Figure 2:
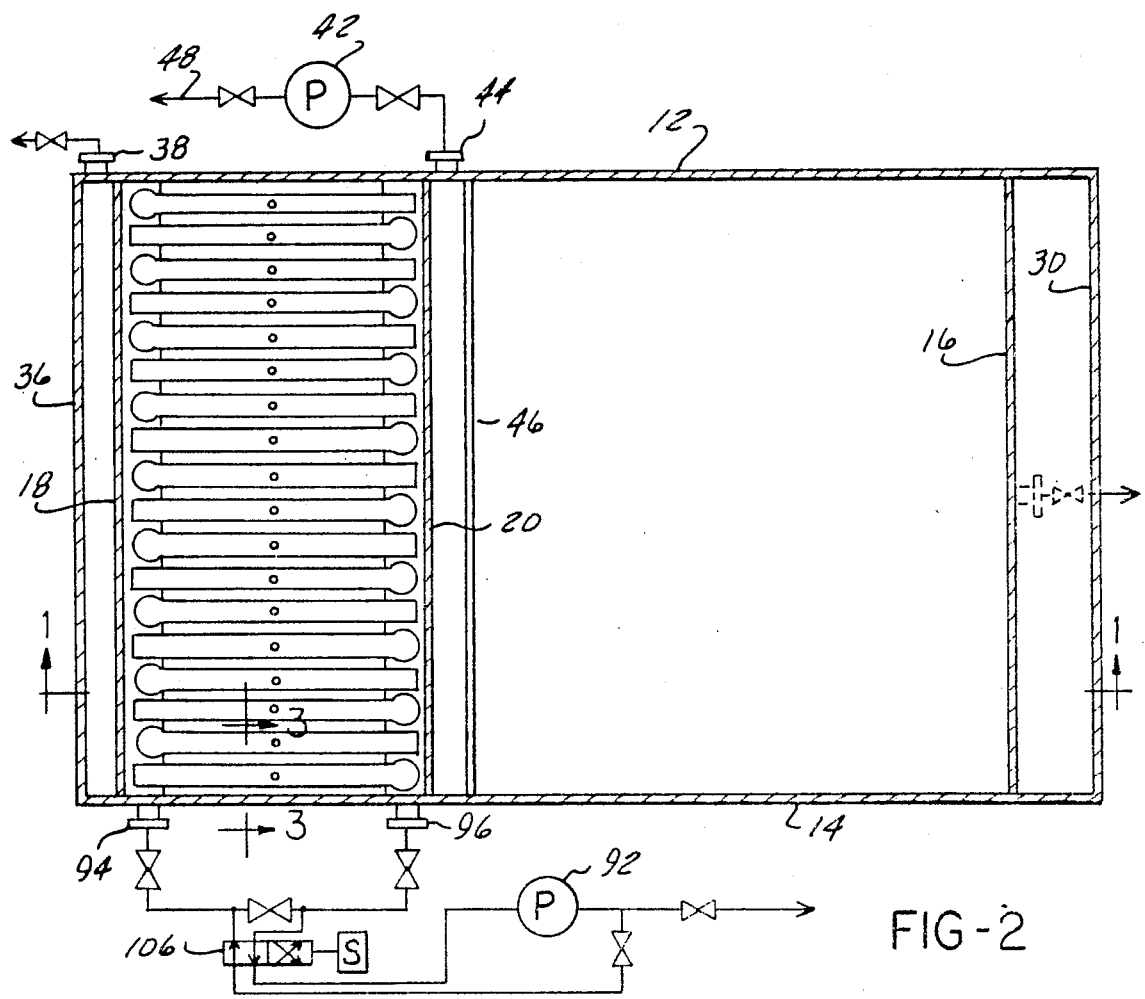
FIG. 2 is a cross sectional plan view taken substantially along the line 2—2 shown in FIG. 1, looking in the direction of the arrows.

One embodiment of the filter apparatus is depicted in FIG. 1 and 2. The filter apparatus generally includes a tank 10 having two opposed side walls 12 and 14, and two opposed end walls 16 and 18. A downwardly extending baffle plate or wall 20 is disposed within the tank transversely between the two side walls 12 and 14 and spaced inwardly from the two end walls 16 and 18. The wall 20 extends from below the top of the tank 10 and terminals at a point disposed above the bottom 22 of the tank 10. The wall 20 generally divides the tank 10 into a first fluid retaining section 24 and a second filter retaining section 26 and allows floating oil or debris to flow from wall 16 to wall 18 by floating over wall 20. The bottom 22 of the tank 10 preferably is sloped to a low point and generally defines a solids collecting section 28 of the tank 10. The open area between the wall 20 and the bottom 22 of the tank 10 defines an under flow baffle arrangement through which unfiltered fluid and entrained solids can be recirculated to the fluid retaining section 24 of the tank 10. The relatively slow velocity of the fluid within the fluid retaining section 24 of the tank 10 allows solids to settle into the solids collection section 28 of the tank 10 for subsequent removal. The tank 10 also includes an unfiltered fluid inlet trough 30 which can be formed on the exterior of the tank 10 as shown in FIGS. 1 and 2, or alternatively may be disposed within the tank 10 adjacent wall 16. As shown, a fluid inlet 32 discharges unfiltered fluid into the inlet trough 30 and subsequently overflows into the fluid retaining section 24 of the tank 10 on overflow baffle 40. In addition, the unfiltered fluid inlet flow may be controlled by valve means 34 for maintaining the fluid level below the top of tank 10. Floating contaminant removal means 36 are provided adjacent wall 18 in fluid communication with the tank 10. The floating contaminant removal means can comprise an overflow trough configuration disposed adjacent the top edge of tank 10 having a fluid outlet 38 for removal of the floating contaminants which overflow into the trough configuration when the fluid level rises slightly above the upper edge of the overflow trough. The overflow trough can be formed on the exterior of tank 10 as shown in FIGS. 1 and 2 allowing floating contaminants to overflow wall 18 into the trough for removal.

Preferably, a flow diverting baffle 40 is disposed within the fluid retaining section 24 of the tank 10. The flow diverting baffle 40 extends between the two side walls 12 and 14 and angles inwardly from the side wall 16. The baffle plate 40 diverts the circulating flow within the fluid retaining section 24 of the tank 10 to provide a relatively still region of fluid allowing contaminants lighter than water to remain on the surface.

Circulating pump means 42 draws unfiltered fluid from the fluid retaining section 24 tank 10 through nozzle 44. Preferably, nozzle 44 is disposed adjacent the third wall 20 and is spaced both above the bottom edge of the third wall 20 and below the floating contaminant overflow trough. This position of the nozzle 44 in combination with the flow diverting baffle 40 provides for gentle mixing of the recirculated unfiltered fluid from the filter retaining section 26 with the unfiltered fluid inlet flow from trough 30 prior to being drawn into the circulating pump means 42. A trough-like configuration 46 extends between the two side walls 12 and 14 adjacent the nozzle 44 to reduce the likelihood of direct recirculation or short circuiting of unfiltered fluid flowing under wall 20 from the filter retaining section 26 of the tank 10. In addition, the trough 46 preferably extends at least as high as the top of the filter panels so that the panels are completely submerged prior to operation of the filter apparatus.

The circulating pump means 42 discharges unfiltered fluid into a fluid conduit or pipe 48 shown in FIG. 2 which is connected to a fluid dispersing assembly generally designated 50 shown in FIG. 1. The fluid dispersing assembly 50 is similar to that disclosed in my prior co-pending U.S. Pat. No. 4,859,332 which is incorporated herein by reference. The fluid dispersing assembly 50 in the present invention disperses unfiltered fluid in a vertically downward direction in the filter retaining section 26 of the tank 10. The fluid dispersing conduit assembly includes a header 52 in fluid communication with a plurality of dispersing conduits 54. Each dispersing conduit 54 has a plurality of openings 56 disposed vertically above and between adjacent filter panels 58.

Figure 3:
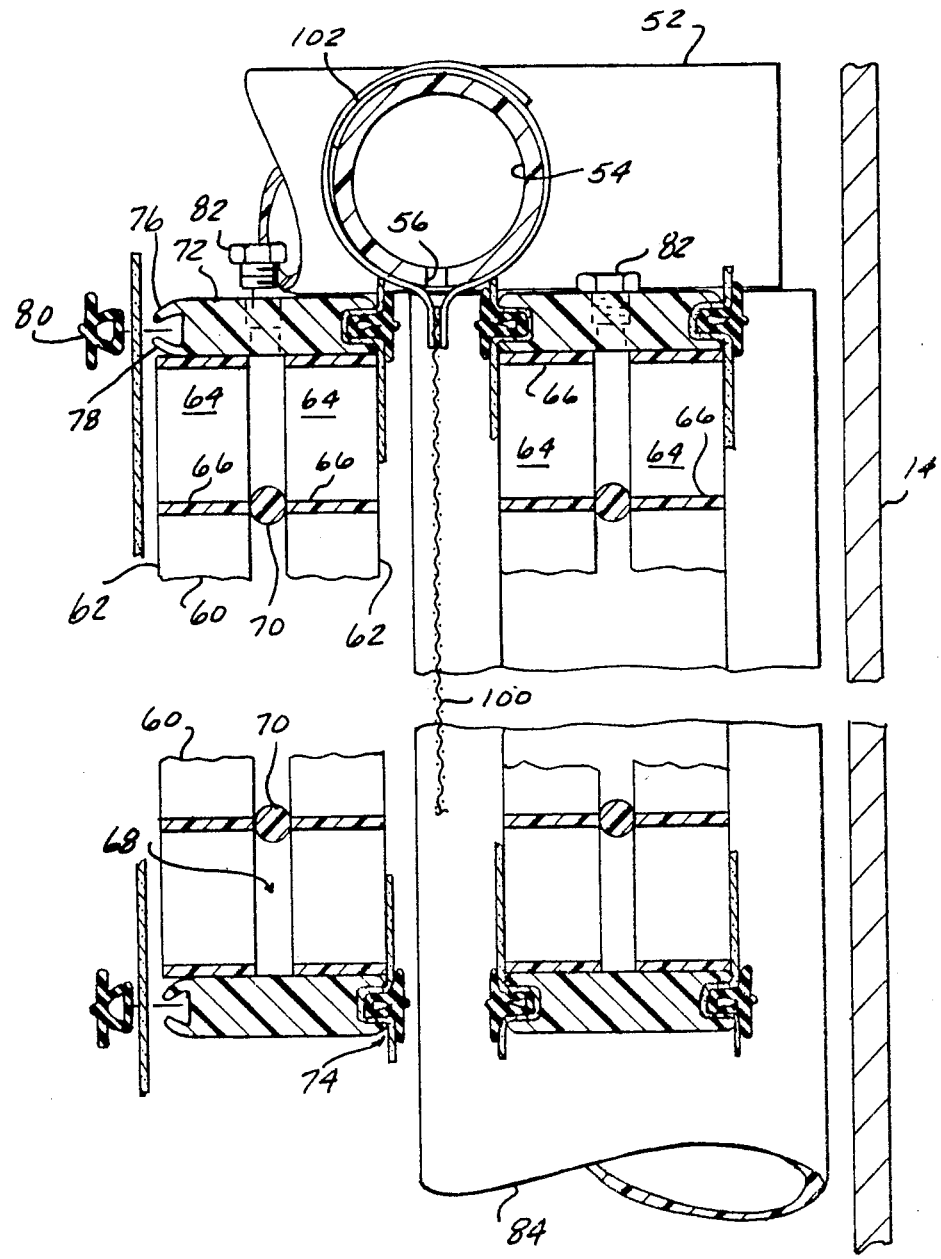
FIG. 3 is an enlarged view of the cross sectional area taken substantially on the line 3—3 shown in FIG. 2, looking in the direction of the arrows.
Figure 4:
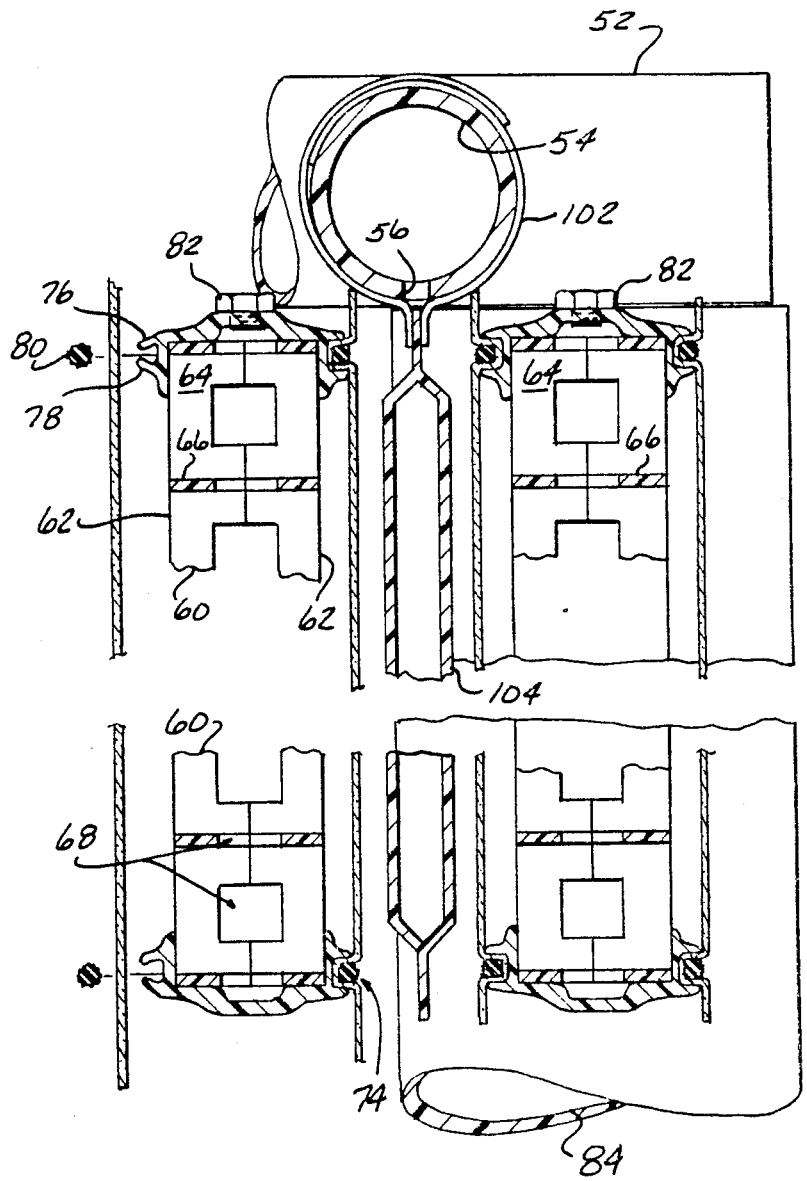
FIG. 4 is an enlarged view of an alternative embodiment taken substantially on the line 3—3 shown in FIG. 2, looking in the direction of the arrows.

The preferred construction and configuration of the filter panels 58 has previously been disclosed in my prior co-pending U.S. Pat. No. 4,859,332; Ser. No. 07/024,383 filed Mar. 19, 1987; and U.S. Pat. No. 4,790,935 which are incorporated by reference in their entirety herein. The preferred embodiment of the filter panel 58 includes a rectangular panel structure 60 having spaced parallel filter supporting surfaces 62 disposed in vertical planes during normal use. Intersecting walls, 64 and 66 respectively, transversely extend between the spaced parallel filter supporting surfaces forming horizontal, vertical, and transverse passageways 68 for filtrate flow within the rectangular panel structure 60. As depicted in FIGS. 3 and 4, the intersecting walls, 64 and 66 respectfully, may be disposed horizontally and vertically, while it should be recognized that other configurations of intersecting walls, 64 and 66 can be used to form horizontal, vertical and transverse fluid flow passageways through the rectangular panel structure 60.

As shown in FIG. 3, spacer members 70 may be disposed between two grid-like rectangular panels 60 to form an open horizontal and vertical passageway between the two panels in communication with the transverse passageway formed by the grid-like panel structure. The spacer members 70 are relatively short with respect to the length of the rectangular panel and are disposed spaced from one another allowing fluid flow of filtrate in both horizontal and vertical directions.

An alternative configuration of the rectangular panel structure 60 is shown in FIG. 4, wherein horizontal and vertical notches are formed in one side of the grid-like rectangular panel. Two of the grid-like panels are then secured together such that the horizontal and vertical notches form the horizontal and vertical passageways through the rectangular panel structure 60.

Referring now to FIGS. 3 and 4, peripheral frame means 72 enclose the edges of the rectangular panel structure 60 to seal the outer regions of the horizontal and vertical passageways from infiltration of unfiltered fluid. Preferably, the peripheral frame means 72 includes a filter membrane mounting means 74 for releasably sealing a filter membrane over the spaced parallel filter supporting surfaces. The filter membrane mounting means 74 generally includes opposed parallel inwardly inclined webs, 76 and 78 respectively, forming a groove extending around the entire periphery of the rectangular filter supporting surface 62 and adapted to receive the filter membrane. The filter membrane is held in place within the groove by a flexible sealing strip 80. Air release means 82 are provided on the top of the filter panel 58 for use while priming the filter panel 58 with clean fluid. The filter panel 58 also includes an outlet pipe 84 in fluid communication with the rectangular panel structure 60 vertically disposed along a vertical edge region of the rectangular panel structure 60. The outlet pipe 84 is in fluid communication with a manifold 86 through a pipe coupler 88, which allows each individual filter panel 58 to be readily removed by breaking the adhesive seal formed between the outlet pipe 84 and the pipe coupler 88. In addition, each of the manifolds 86 is removably supported on manifold supports 90, such that the entire filter assembly can be removed from the tank 10 for servicing.

Referring again to FIGS. 1 and 2, filtrate pump means 92 is in fluid communication with each of the manifolds 86 through manifold outlet nozzles 94 and 96 respectively. The suction inlet of the filtrate pump means 92 applies vacuum pressure to the interior of the filter panels 58 to draw filtrate through the pores of the filter membrane. Preferably, the suction or vacuum pressure of the filtrate pump means is maintained at about 5 inches vacuum pressure (mercury). The low suction pressure reduces the likelihood of cavitation within the filtrate pump means 92, and reduces the vacuum induced adhesion of particles covering the submicron pores in the filter membrane surface, thereby permitting easier removal or flushing of the particles from the filter membrane surface by the cross flowing fluid stream. After removal of the particles from the filter membrane surface by the cross flowing unfiltered fluid, a portion of the unfiltered fluid containing the entrained particles is recirculated into the fluid retaining section 24 of the tank 10. The particles are allowed to settle within this section of the tank due to the low velocity of the fluid and come to rest at the bottom of the tank in the solids collecting section 28. The settled solids may be removed from the bottom of the tank through nozzle 98 by any appropriate means, such as by a conveyor or by draining the settled solids through appropriate piping into sludge collection bags. The sludge collection bags retain the solids while allowing any remaining fluid to drain off, thereby producing a drier sludge cake within the bag for disposal.

In operation, contaminated or unfiltered fluid is delivered to the tank 10 through inlet pipe 32. Water level control means 34 maintains the fluid level in tank 10 by controlling the amount of unfiltered fluid discharging into trough 30. The filtered fluid uniformly over flows the overflow weir onto baffle 40 and into the fluid retaining section 24 of the tank 10. Floating contaminants are allowed to remain on the surface and when an appropriate fluid level is reached, the floating contaminants overflow into the floating contaminant removal means 36 for removal through outlet nozzle 38. The unfiltered fluid is drawn through outlet nozzle 44 into the circulating pump means 42 for discharge through the dispersing assembly 50 in the filter retaining section 26 of the tank 10.

For illustration purposes, the dispersing conduit may take the form of 1¼ inch diameter pipes having ⅜ inch diameter holes spaced ½ inch on center from each other for discharging the unfiltered fluid in a straight vertically downward direction between the filter membrane surfaces of two adjacent filter panels 58. The vertically downward flow being controlled to achieve approximately nine feet per second within the horizontal area defined by the vertical fluid passageway between the two adjacent filter panels 58. The cross flowing unfiltered fluid discharged through the dispersing assembly 50 flows completely through the vertical height of the filter panel 58 as filtrate is drawn through the pores of the filter membrane into the inner passageways of the rectangular panel structure 60. The filtrate is drawn from the rectangular panel structure 60 into the outlet pipe 84 through the pipe coupler 88 into the manifold 86 by the suction inlet of the filtrate pump means 92. The filtrate pump means 92 discharges the filtrate at any suitable location as desired. The excess cross flowing unfiltered fluid entrains or flushes particles from the filter membrane surface as it continues vertically downward past the filter panels 58. The excess unfiltered fluid flow and entrained particles are recirculated back to the fluid retaining section 24, by under flowing wall 20 of the tank 10. As the unfiltered fluid flow velocity falls within the fluid retaining section 24, the solid particulates gradually settle due to the forces of gravity into the solids collecting section 28 of tank 10. The collected solids may be removed through solids discharge nozzle 98. A heater can be attached to nozzle 98 to disperse the fluid held particulate into a series of filter bags attached thereto. The filtrate from the bags can be returned to the system. The recirculating unfiltered fluid gradually mixes with the incoming unfiltered fluid overflowing from trough 30 and is directed by baffle 40 toward the outlet nozzle 44 and recirculating pump means 42. The trough 46 being disposed adjacent the outlet nozzle 44 to reduce short circulating of the recirculating unfiltered fluid flow from the filter retaining section 26 directly back into the circulating pump means 42. By way of non-limiting example, if the inlet flow of unfiltered fluid is approximately 700 gallons per minute, the cross flowing unfiltered fluid is appreciably greater than this having a flow rate of approximately 1000 gallons per minute, while the filtrate flow approximately equals the inlet flow of unfiltered fluid at approximately 700 gallons per minute, and a recirculating unfiltered fluid flows under the wall 20 at a rate of approximately 300 gallons per minute.

Referring again to FIG. 3, the rehabilitating action of the cross flowing unfiltered fluid can be enhanced by suspending a flexible mesh-like screen, wire cloth or grid 100 between adjacent filter panels parallel to the membrane. The waving wire cloth or grid 100 disrupts the laminar unfiltered cross flowing fluid velocity profile resulting in increased turbulence adjacent the filter membrane surface for a more efficient removal of particles from the filter membrane surface. The flexible mesh screen or grid 100 can be suspended from the dispersing conduits 54 by any appropriate means, such as velcro straps 102.

Referring to FIG. 4, the rehabilitating effect of the cross flowing unfiltered fluid can also be enhanced by suspending a flow diverting member 104 between adjacent filter panel membranes. The flow diverting member 104 narrows the horizontal cross sectional area of the fluid passageway between adjacent filter panels 58, thereby increasing the vertically downward velocity of the cross flowing fluid. The increased vertical velocity of the cross flowing fluid with respect to the horizontal velocity of filtrate drawn through the filter membrane area increases the rehabilitation of the membrane by flushing particles from the filter membrane surface to provide a continuously cleaned filter membrane surface. The flow diverting member 104 may be suspended from the dispersing conduits 54 by any suitable means, such as velcro straps 102.

The vacuum-type filter panels will process hundreds of gallons per minute of submicron filtrate while requiring a relatively small amount of floor space. The filter panel arrangement using two filtrate manifolds connected to the suction of a centrifugal pump provides a continuously self-cleaning filter. The system can be configured, if desired, to switch the filtrate flow back and forth between the two filtrate manifolds. While alternate sets of filter panels are under suction pressure, adjacent filter panels can be cleaned by cross flowing fluid and may also be subjected to backwash pressure, if desired and appropriately configured using the piping schematically shown in FIG. 2, in the self-cleaning cycle. In FIG. 2, a small tube carries filtrate from the discharge side of pump 92 to the manifold not under vacuum through a switchable valve 106, which can be operable in response to a timer, pressure gauge or the like.

The cross-flow of the feed stream is perpendicular to the filtrate flow and shears the solids from the membrane surface for deposit in the solids-collection section adjacent the bottom of the filter apparatus. These entrained solids flow continuously to a fluid-retaining section of the tank where the cleanest portion is returning to the feed stream to add impetus to the cross-flow. This produces a true cross flow filter apparatus since the cross flowing fluid stream is continuously recirculating past the filter panels. The filter panels generally weigh less than one pound per square foot of filter area and can be removed and replaced in a very short period of time. The cross flow filter apparatus can be used for oil/water separation, waste treatment, food and beverage, car wash, solvent reclamation, and sewage treatment among other applications. The cross flow filter apparatus can provide up to 35 gallons per minute of 0.2 micron prefiltered water per square foot of 0.8 micron membrane. Membranes of this type are commercially available, such as a Gelman Science Versa Pore membrane. Other filtrate flows can be achieved depending on the membrane selected, which is suitable for the particular application. Submicron filter membranes provides increased single stage filtering efficiency and are the preferred filtering media, because the submicron pores prevent or greatly hinder the intrusion of particles to be filtered into the pores, thereby eliminating a major cause of filter shut down and servicing due to clogged filter media. Instead of becoming lodged within the pore openings, the particles are kept resting on the surface of the membrane, allowing easier removal of the particles by the cross flowing fluid stream.

Having disclosed certain preferred embodiments of my invention for purposes of explanation, further modifications or variations thereof, after study of this specification, will or may occur or become apparent to persons skilled in the art to which the invention pertains. It should be recognized that the present invention is not meant to be limited to submicron filtering and reference should be made to the appendant claims in determining the scope of the present invention.

The invention claimed is:

1. A cross flow filter apparatus comprising:
   an open tank having a first contaminated liquid retaining section, a second filter retaining section and a third solids collection section in fluid communication with each other;
   a filtering assembly retained within the second section, the filtering assembly including a filter panel having a generally vertically disposed filter media surface with pores;
   a filtrate removal pump having a suction inlet in fluid communication with the filter panel for applying vacuum pressure in communication with the filter panel such that filtrate is drawn through the pores of the filter media surface at a flow rate $Q_{out}$; and
   a cross flow pump having a suction inlet in fluid communication with the first contaminated liquid retaining section of the open tank for drawing contaminated liquid from the first section and further having a pressurized discharge outlet in fluid communication with the second filter retaining section of the open tank for discharge pressurized contaminated liquid at a flow rate $Q_x$ vertically downward across the filter media surface, such that the horizontal velocity $V_h$ of liquid drawn through the filter media surface is less than the vertical velocity $V_v$ of the cross flowing contaminated liquid, wherein the vertical velocity $V_v$ flushingly shears particles from the filter media surface while said filtrate removal means operates.

2. The apparatus of claim 1, further comprising liquid inlet means in fluid communication with the first section for delivering liquid to be filtered at a flow rate $Q_{in}$.

3. The apparatus of claim 1, further comprising means for recirculating excess cross flowing contaminated liquid from the second section to the first section.

4. The apparatus of claim 1 wherein the cross flow means comprises:
   pump means for discharging contaminated liquid vertically downward across the filter media surface at a flow rate $Q_{in}$ greater than $Q_{out}$.

5. The apparatus of claim 4, further comprising said pump means drawing fluid from the first section and means for circulating excess cross flowing contaminated liquid from the second section to the first section.

6. The apparatus of claim 4, further comprising:
   flow diverting means for narrowing a generally vertical liquid flow passageway adjacent the filter media surface to a generally horizontal cross sectional area $A_h$ such that the vertical velocity $V_v = (Q_h/A_h) - V_h \geqq 9$ feet per second, wherein $V_h = Q_{out}/A_m$ where $A_m$ is an area of the filter media surface.

7. The apparatus of claim 1 further comprising:
   skimming means for removing floating contaminants from the liquid retaining section.

8. The apparatus of claim 1, further comprising:
   solid removal means for removing solids from the solids collection section.

9. The apparatus of claim 1, further comprising:
   means for disrupting a velocity profile of cross flowing fluid adjacent the filter media surface.

10. The apparatus of claim 1, further comprising:
    first and second filtrate manifolds retaining within the second section, wherein two adjacent filter panels are disposed side-by-side, in staggered, abutting relationship such that one of the adjacent filter panels communicates with the first manifold and the other of the adjacent filter panels communicates with the second manifold.

11. The apparatus of claim 10, further comprising:
    valve means for selectively switching the vacuum pressure applied by the filtrate removal means between the first and second manifolds.

12. The apparatus of claim 11, further comprising:
    means for selectively applying pressurized filtrate in communication with one of the manifolds, while the other of the manifolds communicates vacuum pressure from the filtrate removal means.

13. The apparatus of claim 1, wherein said filter media surface comprising a filter membrane with submicron pores.

14. The apparatus of claim 13, further comprising:
    means for releasably securing the filter membrane to the filter panel with a fluid tight seal.

* * * * *